United States Patent
Inaba

(10) Patent No.: US 8,640,254 B2
(45) Date of Patent: Jan. 28, 2014

(54) PROCESS EXECUTION APPARATUS AND PHONE NUMBER REGISTRATION APPARATUS

(75) Inventor: Michio Inaba, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1446 days.

(21) Appl. No.: 11/966,408

(22) Filed: Dec. 28, 2007

(65) Prior Publication Data

US 2008/0163381 A1    Jul. 3, 2008

(30) Foreign Application Priority Data

Dec. 28, 2006    (JP) .................................. 2006-354204

(51) Int. Cl.
| | | |
|---|---|---|
| G06F 7/04 | (2006.01) | |
| G06F 17/30 | (2006.01) | |
| H04L 9/32 | (2006.01) | |
| G06F 21/31 | (2013.01) | |
| G06F 21/12 | (2013.01) | |
| H04L 29/06 | (2006.01) | |

(52) U.S. Cl.
CPC ............ *G06F 21/313* (2013.01); *G06F 21/121* (2013.01); *H04L 63/08* (2013.01)
USPC ................ 726/28; 726/26; 726/27; 713/155; 713/168

(58) Field of Classification Search
USPC ................................ 726/26–28; 713/155, 168
See application file for complete search history.

(56) References Cited

U.S. PATENT DOCUMENTS

| 6,088,450 A | * | 7/2000 | Davis et al. .................... 713/182 |
| 6,501,837 B1 | * | 12/2002 | Adler et al. .............. 379/210.01 |
| 6,574,599 B1 | * | 6/2003 | Lim et al. ...................... 704/270 |
| 6,731,731 B1 | * | 5/2004 | Ueshima ....................... 379/196 |
| 7,313,699 B2 | * | 12/2007 | Koga ............................. 713/170 |
| 7,512,567 B2 | * | 3/2009 | Bemmel et al. ................. 705/67 |
| 7,574,733 B2 | * | 8/2009 | Woodhill .......................... 726/5 |
| 7,801,918 B2 | * | 9/2010 | Iwase ............................ 707/785 |
| 7,870,599 B2 | * | 1/2011 | Pemmaraju ...................... 726/2 |
| 7,979,892 B2 | * | 7/2011 | Mizumukai ...................... 726/2 |
| 8,024,567 B2 | * | 9/2011 | Han ............................. 713/168 |

(Continued)

FOREIGN PATENT DOCUMENTS

| JP | 2001-219627 | 8/2001 |
| JP | 2002-111897 | 4/2002 |

(Continued)

OTHER PUBLICATIONS

Notification of Reason for Refusal dated Nov. 18, 2008 in Application No. JP2006-354204 and partial English translation thereof.

*Primary Examiner* — Catherine Thiaw

(74) *Attorney, Agent, or Firm* — Banner & Witcoff, Ltd.

(57) ABSTRACT

A process execution apparatus includes a first input unit that receives an instruction from a user, an execution unit that executes a process according to the instruction, a transmitting unit that makes a call to a terminal device having a phone number corresponding to the user, a judging unit that judges whether connection to the terminal device is made, a first authentication unit that determines whether user authentication is successful when the judging unit judges that the connection to the terminal device is made, and a controller that permits execution of the process by the execution unit when the first authentication unit determines that the user authentication is successful.

10 Claims, 8 Drawing Sheets

(56) References Cited

U.S. PATENT DOCUMENTS

| | | |
|---|---|---|
| 8,255,983 B2 * | 8/2012 | Schultz et al. .................... 726/7 |
| 8,462,920 B2 * | 6/2013 | Gonen et al. ................ 379/93.12 |
| 2002/0010678 A1 * | 1/2002 | Utsunomiya ................... 705/40 |
| 2003/0128822 A1 * | 7/2003 | Leivo et al. ................ 379/93.02 |
| 2003/0210420 A1 | 11/2003 | Yamauchi |
| 2003/0229551 A1 * | 12/2003 | Kobayashi ...................... 705/28 |
| 2004/0123162 A1 * | 6/2004 | Antell et al. .................. 713/202 |
| 2005/0012966 A1 * | 1/2005 | Mitchell et al. ................ 358/440 |
| 2005/0097320 A1 * | 5/2005 | Golan et al. .................. 713/166 |
| 2005/0174242 A1 * | 8/2005 | Cohen ........................ 340/573.4 |
| 2005/0225791 A1 * | 10/2005 | Lee ............................... 358/1.14 |
| 2005/0268107 A1 * | 12/2005 | Harris et al. .................. 713/182 |
| 2006/0251224 A1 | 11/2006 | Fukumizu |
| 2007/0055517 A1 * | 3/2007 | Spector ......................... 704/246 |
| 2007/0123233 A1 * | 5/2007 | Houmura et al. ........... 455/414.1 |
| 2007/0160264 A1 * | 7/2007 | Kasahara et al. ............. 382/115 |
| 2007/0175978 A1 * | 8/2007 | Stambaugh ................... 235/379 |
| 2007/0220119 A1 * | 9/2007 | Himmelstein ................. 709/219 |
| 2007/0242659 A1 * | 10/2007 | Cantu et al. .................... 370/352 |
| 2008/0010687 A1 * | 1/2008 | Gonen et al. ..................... 726/28 |
| 2008/0072053 A1 * | 3/2008 | Halim ........................... 713/176 |
| 2008/0091614 A1 * | 4/2008 | Bas Bayod et al. ............. 705/71 |
| 2008/0155699 A1 * | 6/2008 | Fukao ............................. 726/26 |

FOREIGN PATENT DOCUMENTS

| | | |
|---|---|---|
| JP | 2002-176492 A | 6/2002 |
| JP | 2003-323286 | 11/2003 |
| JP | 2003-348270 | 12/2003 |
| JP | 2004-032258 A | 1/2004 |
| JP | 2004-192550 A | 7/2004 |
| JP | 2005-212436 | 8/2005 |
| JP | 2005-212436 A | 8/2005 |
| JP | 2006-217351 | 8/2006 |
| JP | 2006-293831 A | 10/2006 |
| JP | 2006-339826 A | 12/2006 |

* cited by examiner

FIG. 4

| USER NAME | PHONE NUMBER | PASSWORD |
|---|---|---|
| A | XXXXXXXXXX | 1111 |
| B | | 2222 |
| C | YYYYYYYYYY | 3333 |
| ADMINISTRATOR | | 0000 |

PROCESS EXECUTION APPARATUS AND PHONE NUMBER REGISTRATION APPARATUS

CROSS-REFERENCE TO RELATED APPLICATIONS

This application claims priority from Japanese Patent Application No. 2006-354204 filed on Dec. 28, 2006, the entire subject matter of which is incorporated herein by reference.

TECHNICAL FIELD

Aspects of the invention relate to a process execution apparatus and a phone number registration apparatus.

BACKGROUND

An image forming system is configured, for example, by connecting an image forming apparatus and a terminal device via a network. Normally, a user performs a print request operation at the terminal device. Printing data are then transmitted from the terminal device, and upon receiving the printing data, the image forming apparatus performs, as a single job, an expansion process on the printing data and output of a sheet on which is printed an image that is in accordance with the expanded data. Among the printing data transmitted from the terminal device, there are materials of a high level of confidentiality that should be prevented from being seen by others.

SUMMARY

There has been proposed a configuration with which user authentication is performed to prevent operation of the image forming apparatus by parties other than specific users. For example, a password of a user is transmitted along with printing data concerning confidential material hereinafter referred to as "confidential data") from a terminal device, and an image forming apparatus temporarily stores the received confidential data in an internal memory and does not execute a printing process on the confidential data unless the password is input from an operation unit provided on the image forming apparatus itself.

However, when the password is leaked, illicit use of the image forming apparatus by the password cannot be prevented. JP-A-2005-212436 discloses a configuration in which, when a process execution apparatus receives a job from a user, a notification (transmission of mail) is issued to a contact destination that is recorded according to each user and execution of control related to the job is permitted only when a reply (receiving of mail) is issued from the contact destination in response to the notification.

However, in JP-A-2005-212436, even when a valid user uses the image forming apparatus based on the user's own password, the user is constantly required to perform a task of replying by mail to a notification mail transmitted to the user's own terminal device.

Aspects of the present invention provide a process execution apparatus and a telephone registration apparatus that is capable of performing user authentication and registration tasks while reducing efforts on the part of a user as much as possible.

BRIEF DESCRIPTION OF THE DRAWINGS

FIG. 4 is an explanatory diagram of a data structure of a registration database;

DETAILED DESCRIPTION

<General Overview>

Figure 1:
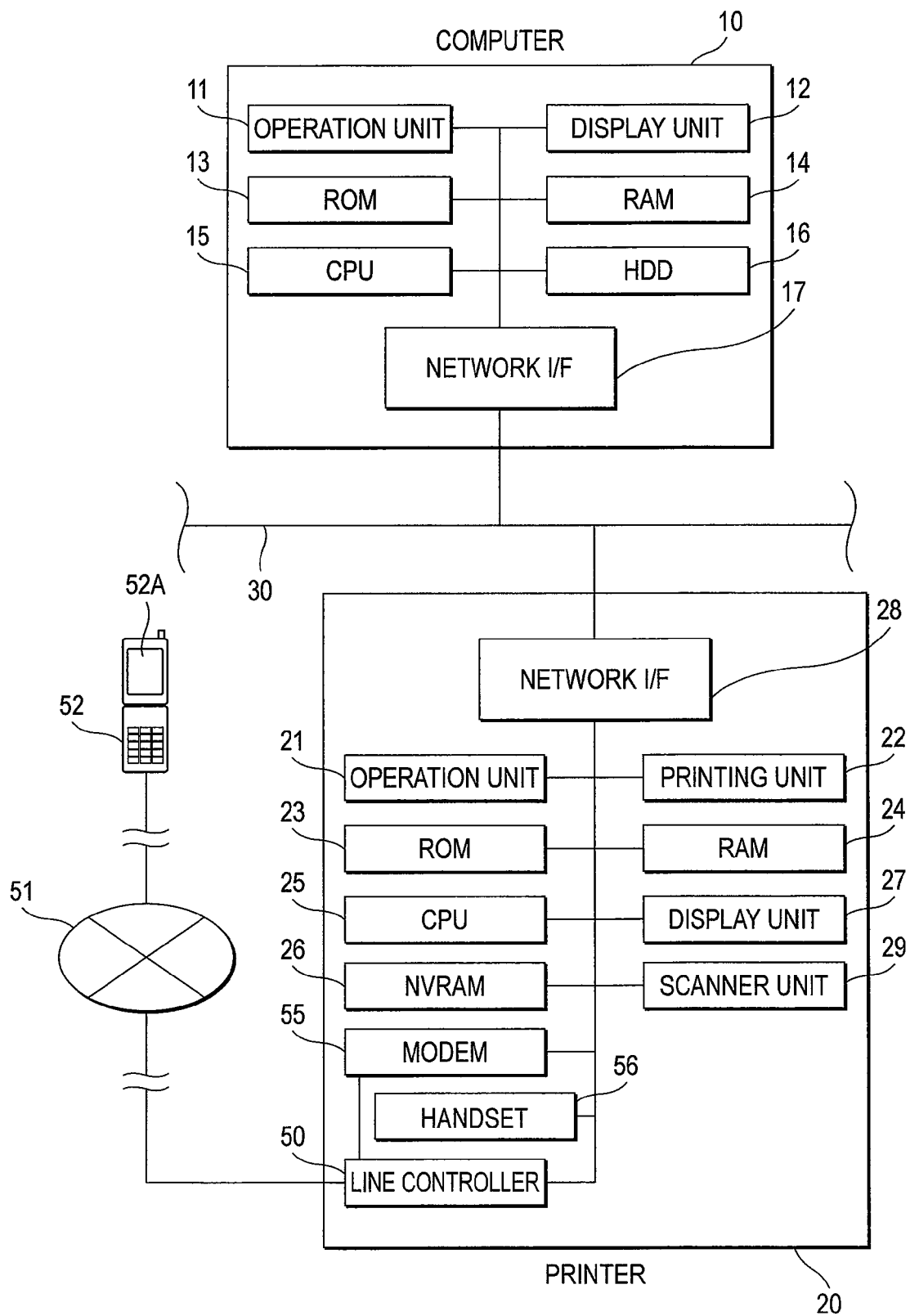
FIG. 1 is an exemplary block diagram of an arrangement of an image reading system.

According to a first aspect of the present invention, there is provided a process execution apparatus including: a first input unit that receives an instruction from a user; an execution unit that executes a process according to the instruction; a transmitting unit that makes a call to a terminal device having a phone number corresponding to the user; a judging unit that judges whether connection to the terminal device is made; a first authentication unit that determines whether user authentication is successful when the judging unit judges that the connection to the terminal device is made; and a controller that permits execution of the process by the execution unit when the first authentication unit determines that the user authentication is successful.

According to another aspect of the present invention, there is provided a phone number registration apparatus including: an input unit into which a phone number is input; a transmitting unit that makes a call to a terminal device having the input phone number into the input unit; a judging unit that judges whether or not connection to the terminal device is made; a memory; and a registration unit that registers the input phone number in the memory when the judging unit judges that connection to the terminal device is made.

According to still another aspect of the present invention, there is provided a method for executing a process, including: receiving an instruction from a user; making a call to a terminal device having a phone number corresponding to the user; judging whether connection to the terminal device is made; determining whether user authentication is successful when the connection to the terminal device is judged to be made; and executing a process in accordance with the instruction when the user authentication is determined to be successful.

<Illustrative Aspects>

Illustrative aspects of the present invention will be described below with reference to the accompanying drawings.

With the present aspect, an image forming apparatus shall be described as an example of a process execution apparatus and a phone number registration apparatus. The image forming apparatus may have a lock function that restricts parties with authority to use specific process or functions (for example, color printing functions, and in a case where the image forming apparatus is a multi-function device, a copy function, facsimile function, etc.) to specific users. Such a function is effective, for example, in a case where management of charging according to each user is to be performed in regard to the use of the specific functions.

The image forming apparatus may have a security print function as one of the above-described specific functions. With the security print function, when printing data are transmitted along with password information unique to a user from an information processing device to the image forming apparatus, the image forming apparatus stores the received data or expanded data resulting from applying an expansion process to the printing data in a memory and is put in a standby state. Only when a password that matches the password included in the received data is input at an operation unit of the image forming apparatus, the image forming apparatus is permitted to execute printing of the printing data onto the recording sheet. In the security function, the operation of instructing the printing of the printing data stored in the memory is restricted to predetermined users. Thus, the security print function is included among the specific functions to be subject to being locked by the lock function.

The lock function and the security function have a point in common in requiring user authentication, by which it is determined whether a user, who attempts to make the image forming apparatus execute a predetermined process, has the usage authority concerning the image forming apparatus. The aspect of the present invention can perform the user authentication without using a password.

(Exemplary Configuration)

FIG. 1 is an exemplary block diagram of an image forming system. This image forming system includes a printer 20, which is an image forming apparatus, and an information processing apparatus (hereinafter referred to as a "computer 10") that is connected to the printer 20 via a first communication line 30 such as LAN.

1. Computer

The computer 10 includes an operation unit 11 that accepts input operations from the exterior via a keyboard, mouse, etc., a liquid crystal display (LCD) or other display unit 12, a ROM 13, a RAM 14, a CPU 15, a hard disk 16, a network interface 17 that is connected to the first communication line 30, etc. A printer driver and other application software, etc., are stored in the hard disk 16. The CPU 15 reads the printer driver, etc., from the hard disk 16 and executes the software based on execution instructions from the operation unit 11. When a security print function is to be used, a user makes a request to print a desired file while designating the security print function by operation at the operation unit 11. The CPU 15 then performs control of transmitting user name information of the user along with the printing data of the desired file to the printer 20. During use of the security print function, when a CPU 25 of the printer 20 receives the user name information from the computer 10, the CPU 25 reads a phone number and an authentication password corresponding to the user name from a registration database and performs respective user authentication processes (see FIGS. 6 and 7).

2. Printer

The printer 20 functioning as the process execution apparatus and the phone number registration apparatus is a so-called multi-function device having a scanner function and a facsimile function. Specifically, the printer 20 includes an operation unit 21, having various keys, etc., a printing unit 22, which performs printing onto a recording sheet as a recording medium, a ROM 23, a RAM 24, the CPU 25, an NVRAM (non-volatile memory) 26, a display unit 27, a network interface 28, and a scanner unit 29, etc. In accordance with a program stored in the ROM 23, the CPU 25 performs control of the respective components while storing processing results in the RAM 24 and the NVRAM 26. The scanner unit 29 emits light from a light source (not shown), such as a lamp, onto an original that has been set, reads an image of the original and outputs corresponding image data. The network interface 28 is connected to the first communication line 30.

The printer 20 performs communication of data, such as printing data, instruction signals, etc., with the computer 10 via the network interface 28.

The printer 20 further includes a line controller 50. The line controller 50 performs such operations as transmitting a signal (dial signal, etc.) to a second communication line 51 such as a public telephone line network, extension line network, internet, etc. and/or responding to a signal from the second communication line 51, etc. The line controller communicates with a communication terminal (a telephone 52 (which may be of a wireless type, such as a cell phone, personal handy-phone system (PHS), etc., or a wired type, such as a fixed-line phone, etc.) via the second communication line 51. The line controller 50 is connected to the second communication line 51, for example, via a telephone line (not shown) installed inside a building and performs audio communication, transmitting and receiving of facsimile data, etc., with the telephone 52 via the second communication line 51 and a base station (not shown). Further, the line controller can communicate with the telephone 52 via the first communication line 30.

A modem 55 is connected to the line controller 50. The modem 55 converts facsimile data to communication signals for transmission to a public telephone line and demodulates signals received from the second communication line 51 to extract facsimile data. A handset 56 that enables audio communication with a communication terminal (the telephone 52, etc.) is connected to the line controller 50.

Figure 2:
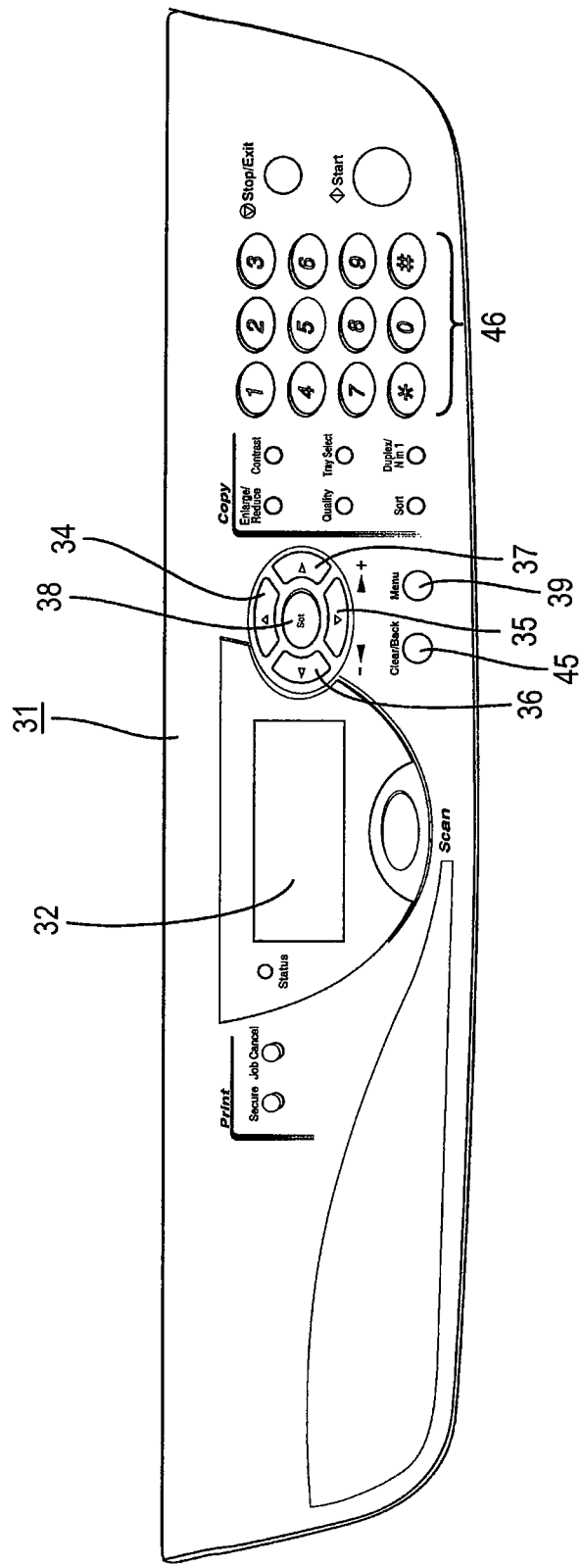
FIG. 2 is an exemplary external view of an operation panel.

FIG. 2 is an exemplary external view of an operation panel 31. The operation panel includes the operation unit 21 of the printer 20. An LCD 32 is provided on the operation panel 31. An up key 34, a down key 35, a left key 36, a right key 37, a set key 38, a menu key 39, a cancel key 45, and numeric keys 46 are provided on the operation panel 31. Operations of these keys enable selection of respective menu items and input of user designations, phone numbers, passwords, etc. A signal, which is output from the operation unit 21 during an operation for changing a usage authority holder to be described below or an operation for executing the printing of printing data, recorded in a memory such as the RAM 24, onto a recording sheet under the security print function, is an example of instruction signal.

(Exemplary Contents of Control by CPU)

Exemplary contents of the control executed by the CPU 25 shall now be described.

Figure 3:
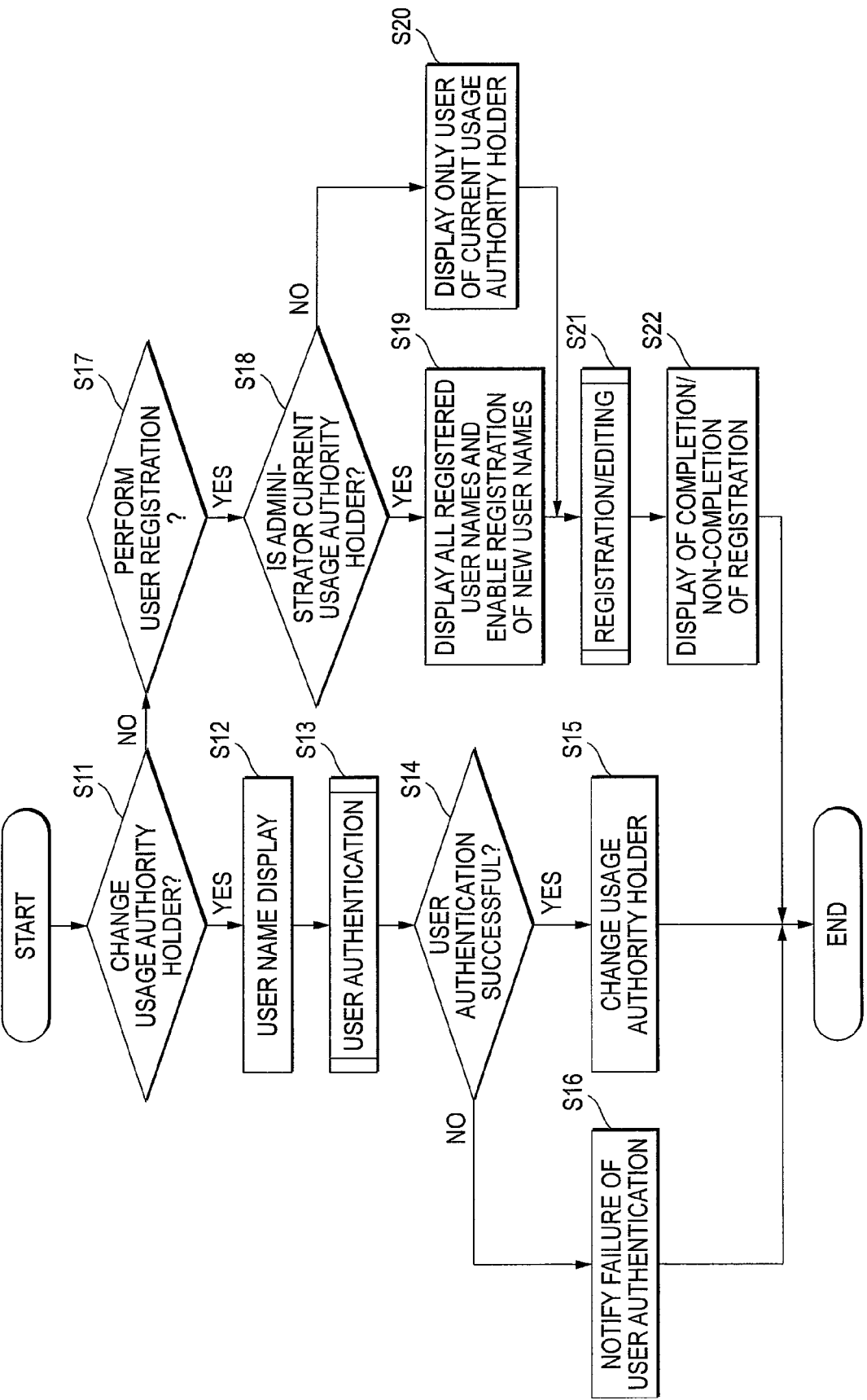
FIG. 3 is an exemplary flowchart of main processes.

When the menu key 39 is depressed, the CPU 25 displays on the LCD 32 a list of various menus including a security menu. When the security menu is designated by operation of the set key, etc., the LCD 32 displays a list including a "Usage Authority Holder Changing Menu," a "User Registration/Editing Menu," etc., for a selection of one menu from this list. FIG. 3 is an exemplary diagram of processes executed by the CPU 25 based on operations that a user performs on the operation unit 21.

1. Change of Usage Authority Holder

For a user attempting to perform an operation concerning any one of the specific functions, the "Usage Authority Holder Changing Menu" is the menu by which the usage authority holder for performing the operation concerning the specific function is changed to the user only if user authentication is performed and the authentication succeeds.

A registration information database is stored in the NVRAM 26. As shown in FIG. 4, in the registration database, a phone number and a password can be stored in association with each user. With the "Usage Authority Holder Changing Menu," the change of usage authority holder can be performed only on users, among the users whose user names are registered in the registration database, whose phone numbers or passwords are recorded.

In S11, the CPU 25 judges which of the menus has been selected. If the "Usage Authority Holder Changing Menu" has been selected (S11: Y), the CPU 25 displays on the LCD 32 the user names that are currently registered in the registration database in a list. When a user name in the list is designated by an operation of the operation unit 21, a user authentication process is performed in S13. The user name designated in this process shall hereinafter be referred to as designated user name.

Figure 6:
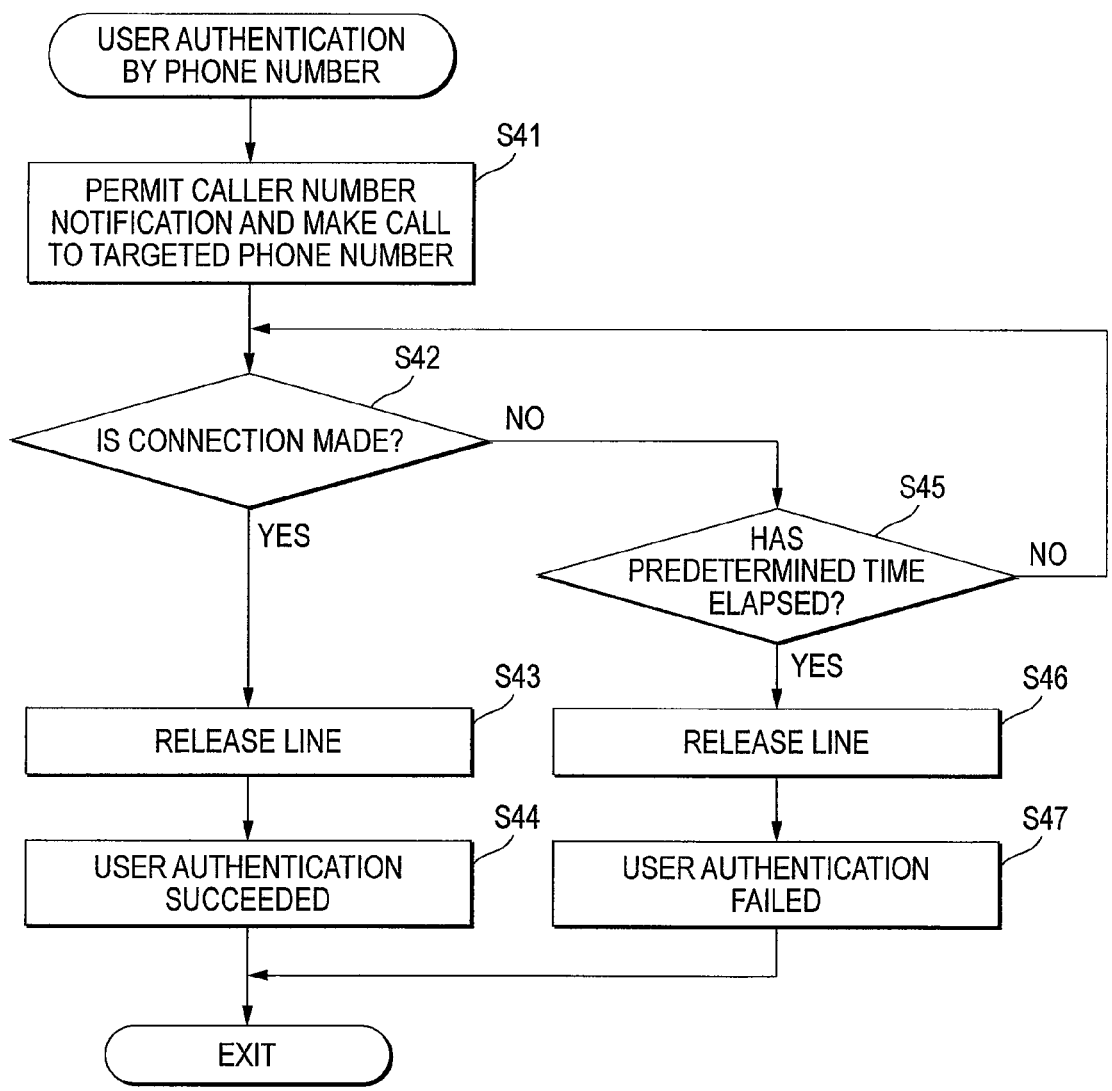
FIG. 6 is an exemplary flowchart of a user authentication process by phone number.
Figure 7:
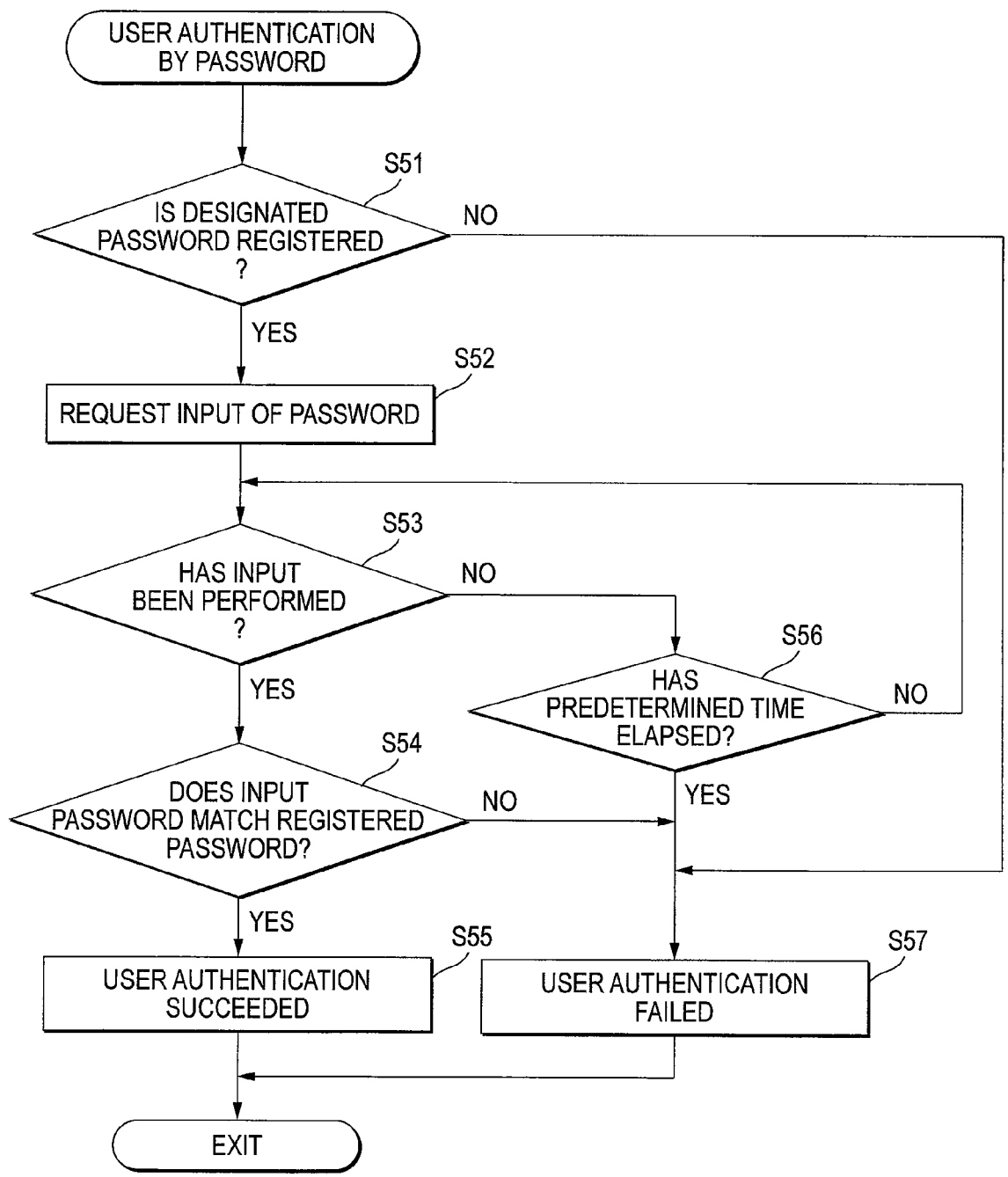
FIG. 7 is an exemplary flowchart of a user authentication process by password.

In the user authentication process, it is judged in S31 whether or not a phone number (hereinafter referred to as designated phone number) corresponding to the designated user name is registered in the registration database. If the designated phone number is registered (S31: Y), a user authentication process by phone number, shown in FIG. 6, is performed in S32. If the designated phone number is not registered (S31: N), a user authentication process by password as shown in FIG. 7 is performed in S34. The user authentication process by password is also executed when the user authentication fails in the user authentication process by phone number (S31: Y and S33: N).

First, in the user authentication process by phone number, the designated phone number is read and a call is made via the line controller 50 to a terminal device 52 with the designated phone number in S41 of FIG. 6. In this process, the CPU 25 and the line controller 50 function as an example of a transmitting unit. In S42, it is judged whether or not a connection is made, in other words, whether or not the called telephone 52 of the designated phone number is put in an off-hook state. In general, when the called telephone 52 is changed from an on-hook state (call rejection state) to the off-hook state by, for example, the raising of a receiver or by depression of an off-hook button of a cell phone, etc. and a connection with the called telephone 52 is made via the second communication line 51, etc., a transmission of a ring tone by a switchboard (not shown) in the second communication line 51 stops, and polarity of the line becomes inverted by the switchboard. The line controller 50 can judge that the telephone 52 of the designated phone number has been put in the off-hook state by detecting that the transmission of the ring tone has stopped or by detecting that the polarity of the line has been inverted. The CPU 25 can recognize whether or not a connection has been made by receiving the recognition result of the line controller 50.

Figure 5:
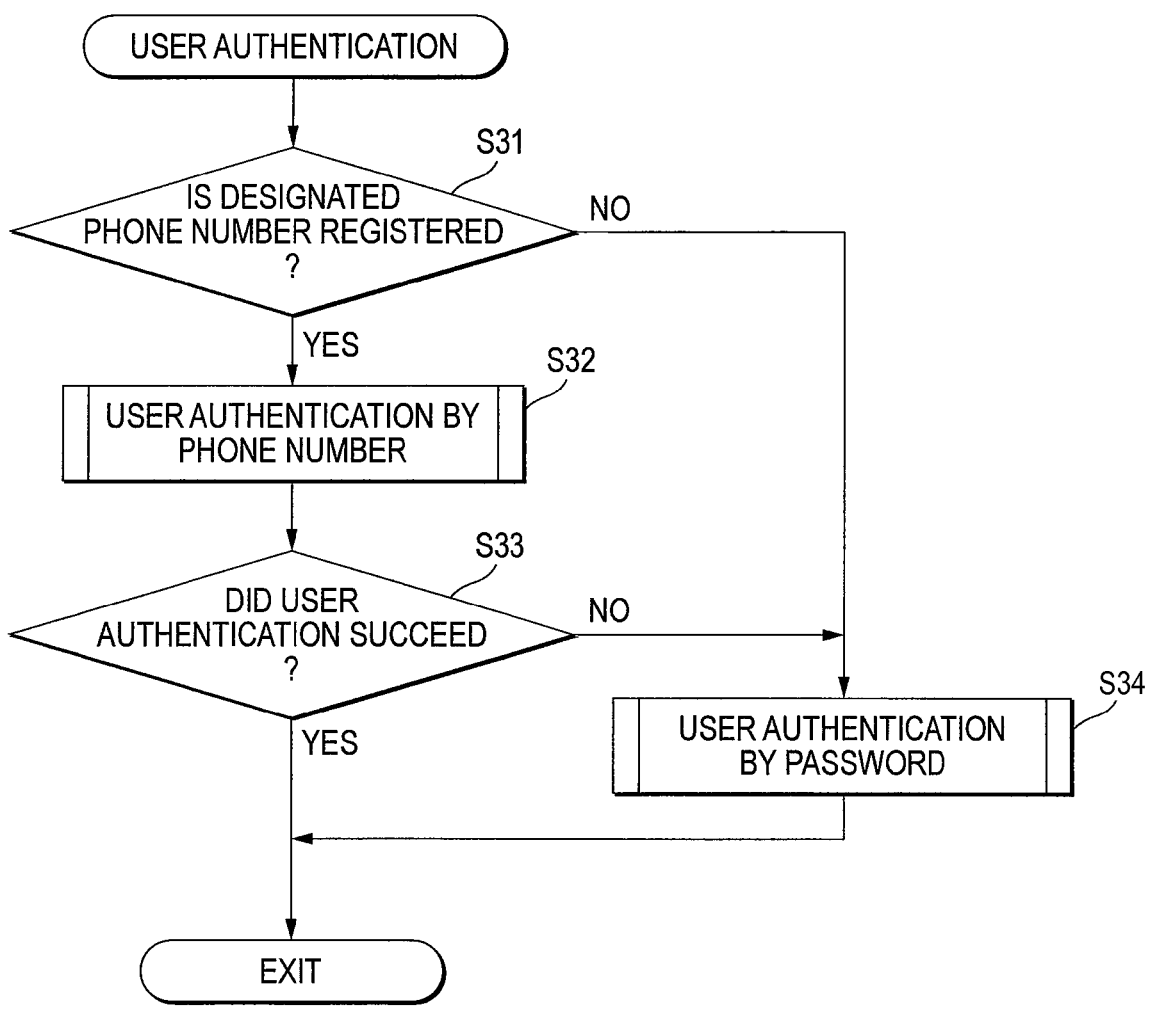
FIG. 5 is an exemplary flowchart of a user authentication process.

When the called telephone 52 with the designated phone number is put in the off-hook state within a predetermined time from the start of making of the call to the telephone 52 (S42: Y), the line is released and a flag indicating success of user authentication is set (S43, S44). In contrast, if the called telephone 52 is not put in the off-hook state within the predetermined time (S42: N and S45: Y), the line is released. Further, the user authentication success flag is not set (S46, S47) because it is deemed that the user authentication has failed. The process goes to the flow of FIG. 5, which shows an exemplary flowchart of a user authentication process. If the user authentication success flag is set (S33: Y), the process returns to the main process of FIG. 3. Since the judgment result at S14 is "Y," the usage authority is granted to the user of the designated user name.

For example, when a user A changes the usage authority holder to him/herself, the user A first designates his/her own user name "A." If a designated phone number (for example, a phone number of a telephone 52 owned by the user A) corresponding to the designated user name "A" is registered in the registration database, a call is made from the printer 20 to the user A's own telephone 52. Moreover, a phone number of the printer 20 is displayed on a display unit 52A of the telephone 52 of the user A. The user A can thus know that the call is from the printer 20. If the user A's own telephone 52 is put in the off-hook state within the predetermined time, user authentication succeeds.

Meanwhile, if a third party besides the user A designates the user name "A" in an attempt to change the usage authority holder to the user A, a call is made to the telephone 52 of the user A in accordance with the designated phone number in this case as well. In this process, the phone number of the printer 20 is displayed on the display unit 52A of the telephone 52 of the user A. The user A can thus tell that a call is being made from the printer 20 and that a third party is trying to use a specific function under the user A's own user name "A." By then leaving the telephone alone and not putting it into the off-hook state until the predetermined time elapses or by forcibly disconnecting the line by depressing the on-hook button of the user A's own telephone 52, the user authentication is made to fail. Accordingly, usage by the third party can be prevented.

Next, in the user authentication process by password, whether or not a password (hereinafter referred to as "designated password") corresponding to the designated user name is registered is judged in S51 as shown in FIG. 7. If the password is registered (S51: Y), a message requesting the input of the password is displayed, for example, on the LCD 32 to request the user to input the password in S52. The user then inputs the password by operation at the operation unit 21.

If the password input is performed within a predetermined time from the point at which the password input was requested in S52 (S52: Y), whether or not the input password and an authentication password, registered in the registration database, match is judged (S54). If the input password and the authentication password are matched (S54: Y), a user authentication success flag is set (S55). In contrast, if the password input is not performed within the predetermined time (S52: N and S56: Y), it is deemed that the user authentication failed and the user authentication success flag is not set (S57).

In contrast, if the designated password is not registered in the registration database (S51: N), it is deemed that the user authentication failed (S57). The failure of the user authentication is notified in S16 of FIG. 3. Specifically, the failure of the user authentication is notified on the LCD 32. Further, an arrangement that makes the notification by lighting up a lamp (not shown) or outputting a sound from a speaker (not shown) may be also possible.

According to the above-described aspect, the user authentication by phone number and the user authentication by password can be performed. However, in such case, a password must be remembered and an effort is required to input the password. Therefore, regardless of whether the designated password is registered in the registration database, the user authentication by telephone is performed with priority if the designated phone number is registered (see FIG. 5).

If the printer 20 is in an initial state, in which information on each user is not registered in the registration database, only an initial password (for example, "0000") corresponding to an administrator is registered. In this state, the user authentication by telephone cannot be performed. Thus, the administrator first uses the initial password to perform the user authentication by password (see S34 of FIG. 5) to obtain the usage authority. According thereto, registration of information on the administrator him/herself and other users into the registration database can be performed.

There is also the merit that, for a user besides the administrator, the usage authority can be obtained by the user authentication by password when a designated phone number is not registered in the registration database or when the user's own telephone 52 is not at hand even though the phone number of the telephone 52 is registered.

2. User Registration/Editing

Figure 8:
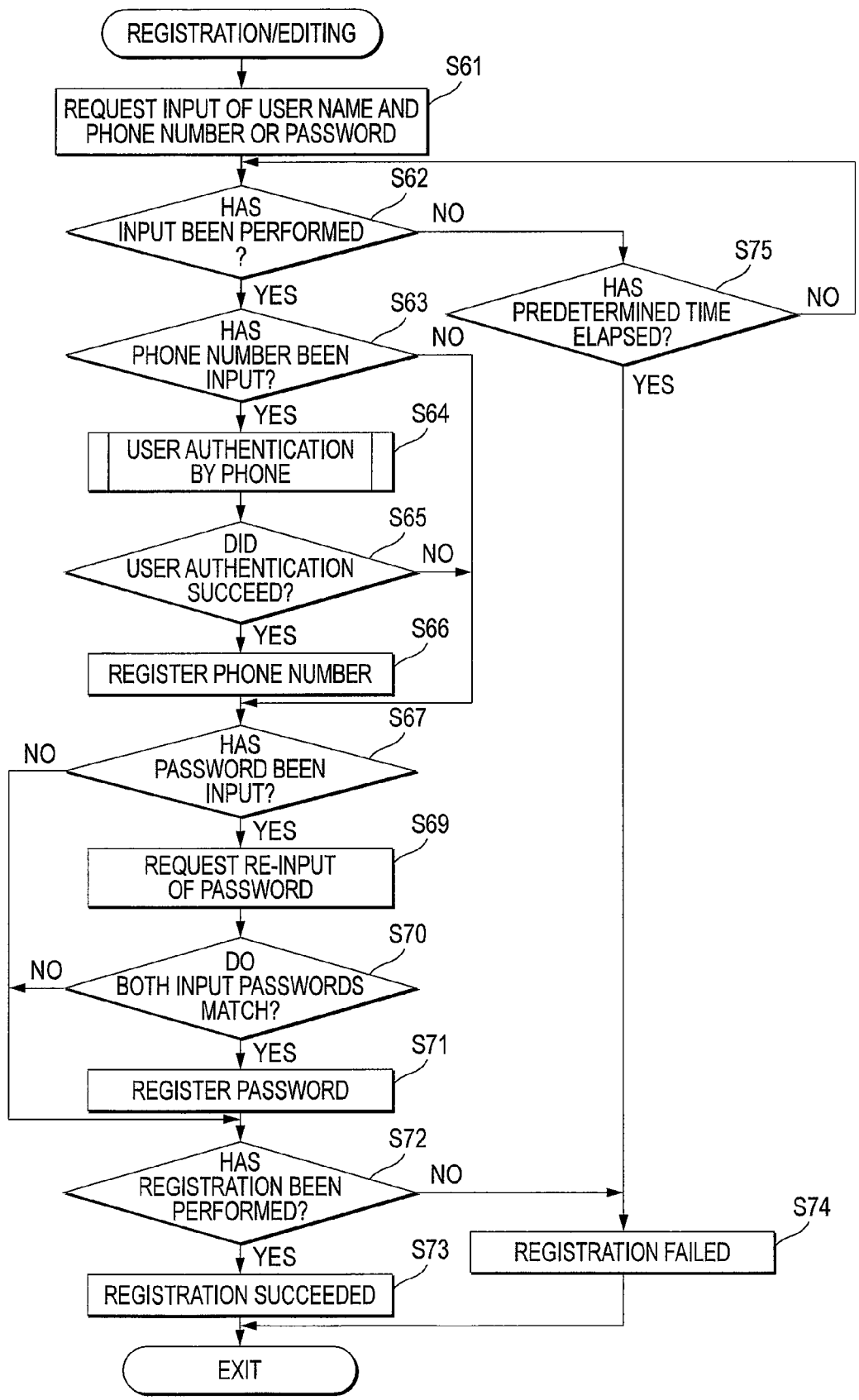
FIG. 8 is an exemplary flowchart of a registration/editing process.

With the "User Registration/Editing Menu," the administrator can edit (change, add, or delete) registered contents of registered users in the registration database and additionally register new user names as candidates for the usage authority holder. In contrast, a user besides the administrator can only edit the user's own registered contents. Upon succeeding in user authentication and obtaining the usage authority with the "Usage Authority Holder Changing Menu," the administrator can designate a "User Registration Menu." When the "User Registration Menu" is designated (S11: N and S17: Y), the CPU 25 judges in S18 whether the current usage authority holder is the administrator. If the current usage authority holder is the administrator (S18: Y), makes the names of all currently registered users be displayed on the LCD 32 in S19. When a specific user name is designated, the process goes to S21, and a registration/editing process shown in FIG. 8 is executed. According thereto, the registered contents concerning the designated user name can be edited. Incidentally, when additional registration of a new user name is designated by input at the operation unit 21, the process also goes to S21.

Meanwhile, if the current usage authority holder is not the administrator (S18: N), only the user name of the current usage authority holder is displayed on the LCD 32 in S20. Then, the process goes to S21. In such case, only editing of the registered contents of the current usage authority holder is enabled in S21.

In the registration/editing process of FIG. 8, first, a user is requested to input at least one of either a phone number or a password via the LCD, for example (S61). Then, if a phone number is input within a predetermined time (S62: Y and S63: Y), the user authentication by phone number, shown in FIG. 6, is performed in S64. That is, a call is made via the line controller 50 to a telephone 52 with the input phone number. If the telephone is put in the off-hook state within a predetermined time, it is deemed that the user authentication has succeeded. In contrast, if the telephone is kept in the on-hook state past the predetermined time, it is deemed that the user authentication has failed.

For example, the user A, who is the current usage authority holder, inputs a phone number "XXXXXXXXXXX" of a user A's cell phone into the operation unit 21 of the printer 20. If shortly, a call is made to the user A's cell phone and a phone number of the printer 20 becomes displayed on a display unit of the cell phone. This means that the phone number of the cell phone has been input correctly into the printer 20. Thus, the user A puts the cell phone in the off-hook state within the predetermined time. It is thereby judged at the printer 20 side that the user authentication has succeeded.

In contrast, if the user A inputs a wrong phone number that differs from the phone number of the user A's cell phone, a call is not made to the user A's cell phone. Even if a call is made, it may be a call made from a party besides the printer 20, and a phone number other than that of the printer 20 is displayed on display unit of the user A's cell phone. If the printer 20 makes a call for user authentication to a telephone of a third party besides the user A (a telephone with the phone number differing from the designated phone number) based on such an erroneously input phone number, the third party may accept the call and a circumstance where the printer 20 erroneously judges that the user authentication has succeeded may occur. However, since a call is not made to the user A's cell phone, the user A can know that an input error has been made. Thus, the user A can perform registration again.

In the above example, the phone number is input by operating the operation unit 21. However, the phone number may be input by making a call to the printer 20 from a telephone (for example, the telephone 52), for which the phone number is to be input, with notifying the phone number thereof. In this case, the line controller 50 receives the phone number information from the telephone.

If the user authentication succeeds (S65: Y), the phone number is recorded in the registration database in association with the user name of the current usage authority holder in S66. If the phone number is already registered, the old phone number is overwritten and renewed by the currently input new phone number. In contrast, if the user authentication fails (S65: N), the phone number is not recorded.

If a password has been input (S63: N and S68: Y or S67: Y), input of the password is requested again via the LCD 32 in S69. If the password that has been input the first time and the password that has been input the second time match (S70: Y), the password is recorded in the registration database in association with the user name of the current usage authority holder (S71). If a password is already registered, the old password is overwritten and renewed by the currently input new password. In contrast, if the passwords do not match (S70: N), registration of the new password is not performed.

If the registration of at least one of either the phone number or the password succeeds (S72: Y), a registration success flag is set in S73, and the process goes to S22 of FIG. 3. In contrast, if registration of neither the phone number nor the password succeeds (S72: N), it is deemed in S74 that registration has failed and thus the process goes to S22 of FIG. 3 without setting the registration success flag. If neither a phone number nor a password is entered within the predetermined time after S61 (S62: N and S75: Y), it is deemed in S74 that registration has failed and thus the process goes to S22 of FIG. 3 without setting the registration success flag.

In S22, success or failure of registration is displayed, for example, on the LCD 32. Here, even if registration has succeeded, if one of either the phone number or the password could not be registered (S65: N or S70: N in FIG. 8), such information may also be displayed on the LCD 32.

With the present aspect, when an instruction for a predetermined process is issued by a user, the printer 20 makes a call to a telephone of the user. If it is judged that connection to this telephone is made (when the telephone is put in the off-hook state), user authentication is judged to be successful and execution of the predetermined process is permitted. The user authentication can thus be performed readily based on connection/disconnection of the telephone line. That is, the user authentication can be performed by the user performing a simple operation of taking the call by, for example, putting the telephone in the off-hook state. Also, by restricting the time for judging whether or not connection to the telephone is made to within a predetermined time, the precision of the user authentication can be improved.

An arrangement may be possible in which the phone number of the user who is currently issuing an instruction is acquired each time by operation by the user or by data transmission by an external device. However, it is preferable for a phone number to be registered according to each user in the registration database in advance as in the present aspect.

In the registration/editing process of FIG. 8, a phone number to be registered can be transmitted to the printer 20 by making a call to the printer 20 by the telephone with the phone number. Accordingly, waste of time and labor of inputting the phone number can be eliminated. Also, when a phone number to be registered is input, a call is made to the telephone with the phone number. If it is judged that connection to the telephone is made (when the telephone is put in the off-hook state), the phone number is registered in the registration database. Thus, whether or not the input phone number is correct can be checked readily by connection/disconnection of the telephone line.

<Other Aspects>

While the invention has been described above based on the above aspects, aspects of the invention is not limited. Various improvements or modifications may be made thereto.

In the above aspect, the image forming apparatus (printer 20) is the "process execution apparatus and phone number registration apparatus." However, any device requiring user authentication or any device requiring phone number registration can be used.

The "process execution apparatus" includes a configuration in which, such as the image forming system of the embodiment, the process execution apparatus is communicably connected to an information processing device and receives an instruction signal based on an instruction of a user from the information processing device. Here, the instruction is not limited to a print request and may be any signal that instructs a predetermined process executable by the process execution apparatus. Further, under such configuration, the instruction signal may be transmitted along with phone number information of the user from the information processing device, and the process execution apparatus may execute the user authentication process by using the received phone number. With such configuration, registration in a registration database can be made unnecessary. Specifically, in the above aspect, when the security print function is to be used, the computer 10 that makes a print request is arranged to transmit phone number information along with the printing data, and the printer 20 is arranged to use the received phone number to perform the user authentication process by phone number (see FIG. 6).

In the above aspect, the user authentication shown in FIG. 6 is performed according to whether or not connection is made to the line of the called telephone within the predetermined time. However, it is also possible to perform the user authentication according to whether the number of rings. (number of call tones) after the call is made has reached a predetermined number.

It may also be configured such that, when a cell phone of a user who makes a call is put in the off-hook state, the printer 20 transmits a randomly selected or generated password to the user by audio transmission, and the change of user authority is accepted when the password is input by the operation unit 21 of the printer 20. In such configuration, since the user simply inputs the received password by audio transmission from the printer, the user does not have to memorize his/her own password.

What is claimed is:

1. A process execution apparatus comprising:
a first input unit that is configured to receive an instruction from a user;
an image forming unit that is configured to execute a process according to the instruction;
a database memory including a record, wherein the record includes a user name and a phone number associated with the user name;
a communication unit that is configured to make a call to a terminal device using a phone number;
a controller that is coupled to the first input unit, the image forming unit, the database memory and the communication unit, wherein the controller includes a processing unit; and
memory that stores instructions that, when executed by the processing unit, cause the controller to perform the steps of:
detecting that a user name has been selected via the first input unit;
retrieving a phone number associated with the user name from the database memory;
causing the communication unit to make a call to a terminal device having the retrieved phone number responsive to the controller detecting that the user name has been selected;
detecting whether the communication unit has received a signal indicating that the communication unit is successfully coupled to the terminal device having the retrieved phone number, wherein the signal is generated in response to the terminal device, which has the retrieved phone number, receiving the call from the communication unit and connecting to the call;
determining whether authentication by user name is successful including
determining that authentication by user name is successful and causing the image forming unit to execute the process in response to the communication unit receiving the signal indicating that the communication unit is successfully coupled to the terminal device having the retrieved phone number; and
determining that authentication by user name is unsuccessful and not causing the image forming unit to execute the process when the controller does not detect that the communication unit receives the signal indicating that the communication unit is successfully coupled to the terminal device having the retrieved phone number;
causing execution of authentication by password when authentication by user name is determined to be unsuccessful; and
causing the image forming unit to execute the process when authentication by password is successful.

2. The process execution apparatus according to claim 1, wherein the controller performs the step of determining that authentication by user name is successful when detecting that the communication unit receives the signal indicating that the communication unit is successfully coupled to the terminal device within a predetermined time from when the communication unit starts to make the call to the terminal device, and
wherein the controller performs the step of determining that authentication by user name is unsuccessful when not detecting that the communication unit receives the signal indicating that the communication unit is successfully coupled to the terminal device within the predetermined time from when the communication unit starts to make the call to the terminal device.

3. The process execution apparatus according to claim 1, further comprising:
a second input unit that is configured to receive a password, wherein the record in the database memory further includes a password associated with the user name,
wherein causing the image forming unit to execute authentication by password includes the controller performing the steps of retrieving the password associated with the user name from the database memory when not detecting that the communication unit receives the signal indicating that the communication unit is successfully coupled to the terminal device having the retrieved phone number;

determining that authentication by password is successful and authenticating the user name when the password received from the second input unit and the password retrieved from the database memory are the same; and determining that authentication by the password is unsuccessful and not authenticating the user name and not causing the image forming unit to execute the process when the password received from the second input unit and the password retrieved from the database memory are not the same.

4. The process execution apparatus according to claim 1, wherein the signal indicating that the communication unit is successfully coupled to the terminal device having the retrieved phone number is generated at an instant when the terminal device, which has the retrieved phone number, receives the call from the communication unit and connects to the call.

5. A phone number registration apparatus comprising:
an input unit configured to receive a phone number as an input;
a registration memory;
a communication unit that is configured to make a call to a terminal device using the input phone number;
a controller that is coupled to the input unit, the registration memory and the communication unit, wherein the controller includes a processing unit, and
memory that stores instructions that, when executed by the processing unit, cause the controller to:
  cause the communication unit to make a call to a terminal device having the input phone number when detecting that input phone number has been input via the input unit;
  determine whether authentication by input phone number is successful including
    determine that authentication by input phone number is successful in response to the communication unit receiving a signal indicating that the communication unit is successfully coupled to the terminal device having the input phone number, wherein the signal is generated in response to the terminal device, which has the input phone number, receiving the call from the communication unit and connecting to the call;
    determine that authentication by input phone number is unsuccessful when the controller does not detect that the communication unit receives the signal indicating that the communication unit is successfully coupled to the terminal device having the input phone number;
  record the input phone number in the registration memory when determining that authentication by input phone number is successful;
  cause execution of authentication by password when determining that authentication by input phone number is unsuccessful; and
  record the password in the registration memory when authentication by password is successful.

6. The phone number registration apparatus according to claim 5, wherein the controller records the input phone number in the registration memory when determining that authentication by input phone number is successful within a predetermined time after the communication unit starts to make the call.

7. The phone number registration apparatus according to claim 5, wherein the signal indicating that the communication unit is successfully coupled to the terminal device having the input phone number is generated at an instant when the terminal device, which has the input phone number, receives the call from the communication unit and connects to the call.

8. A method for executing a process, comprising:
receiving an instruction from a user via an input unit;
first detecting that a user name has been selected via an input unit;
retrieving a phone number associated with the user name from a database memory;
causing a communication unit to make a call to a terminal device having the retrieved phone number responsive to said detecting that the user name has been selected;
second detecting whether the communication unit has received a signal indicating that the communication unit is successfully coupled to the terminal device having the retrieved phone number, wherein the signal is generated in response to the terminal device, which has the retrieved phone number, receiving the call from the communication unit and connecting to the call;
determining whether authentication by user name is successful including
  determining that authentication by user name is successful in response to the communication unit receiving the signal indicating that the communication unit is successfully coupled to the terminal device having the retrieved phone number;
  determining that authentication by user name is unsuccessful when said second detecting does not detect that the communication unit receives the signal indicating that the communication unit is successfully coupled to the terminal device having the retrieved phone number;
causing execution of authentication by password when said determining determines that authentication by user name is unsuccessful; and
causing an image forming unit to execute a process in accordance with the instruction when said determining determines that authentication by user name is successful; and
causing the image forming unit to execute the process when authentication by password is successful.

9. The method for executing a process according to claim 8, wherein said determining determines that authentication by user name is successful when said second detecting detects that the communication unit receives the signal indicating that the communication unit is successfully coupled to the terminal device within a predetermined time from when starting to make the call to the terminal device.

10. A method for executing a process according to claim 8, wherein the signal indicating that the communication unit is successfully coupled to the terminal device having the retrieved phone number is generated at an instant when the terminal device, which has the retrieved phone number, receives the call from the communication unit and connects to the call.

* * * * *